July 19, 1955 V. ISACCO 2,713,393
TELESCOPIC BLADE FOR ROTATING WING AIRCRAFT
Filed June 10, 1952 6 Sheets-Sheet 1
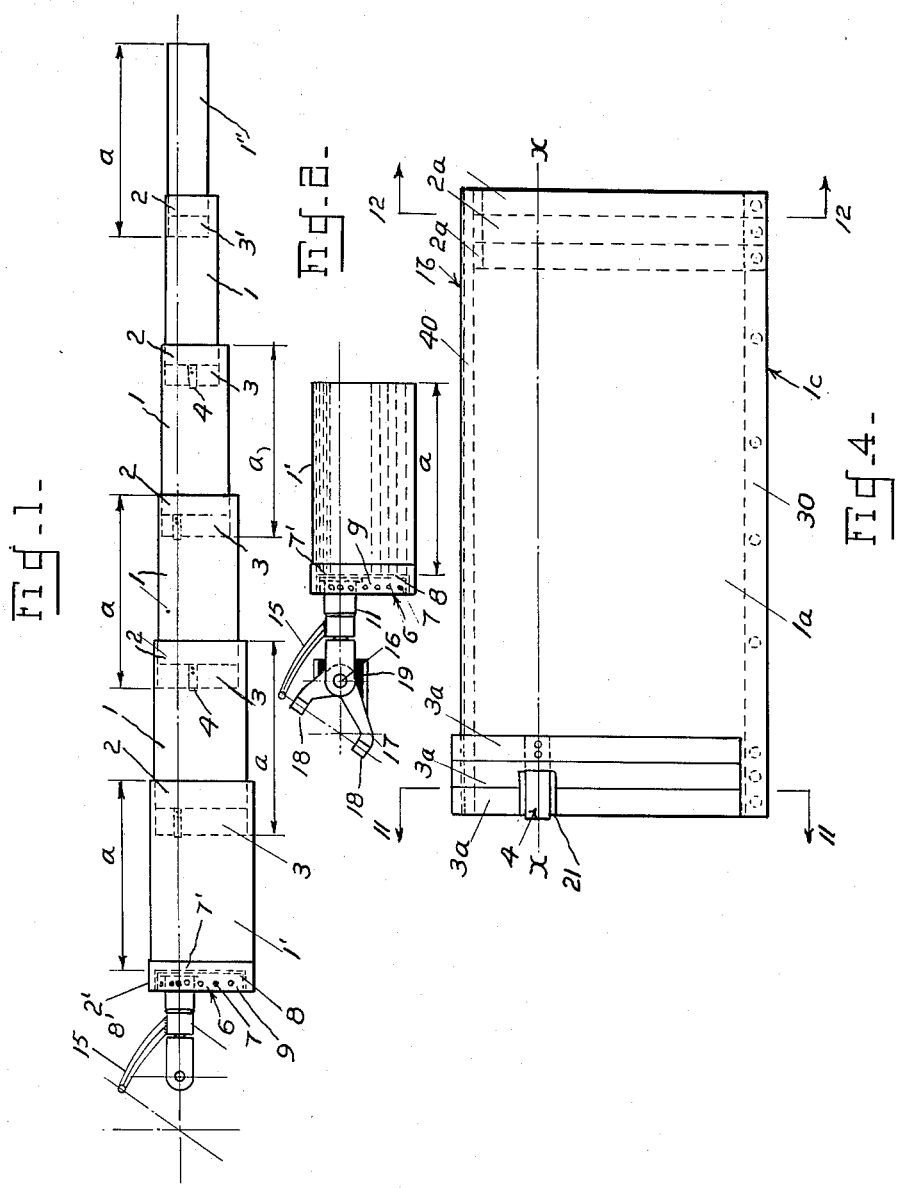
INVENTOR.
Vittorio Isacco,
BY
ATTORNEY July 19, 1955 V. ISACCO 2,713,393
TELESCOPIC BLADE FOR ROTATING WING AIRCRAFT
Filed June 10, 1952 6 Sheets-Sheet 2
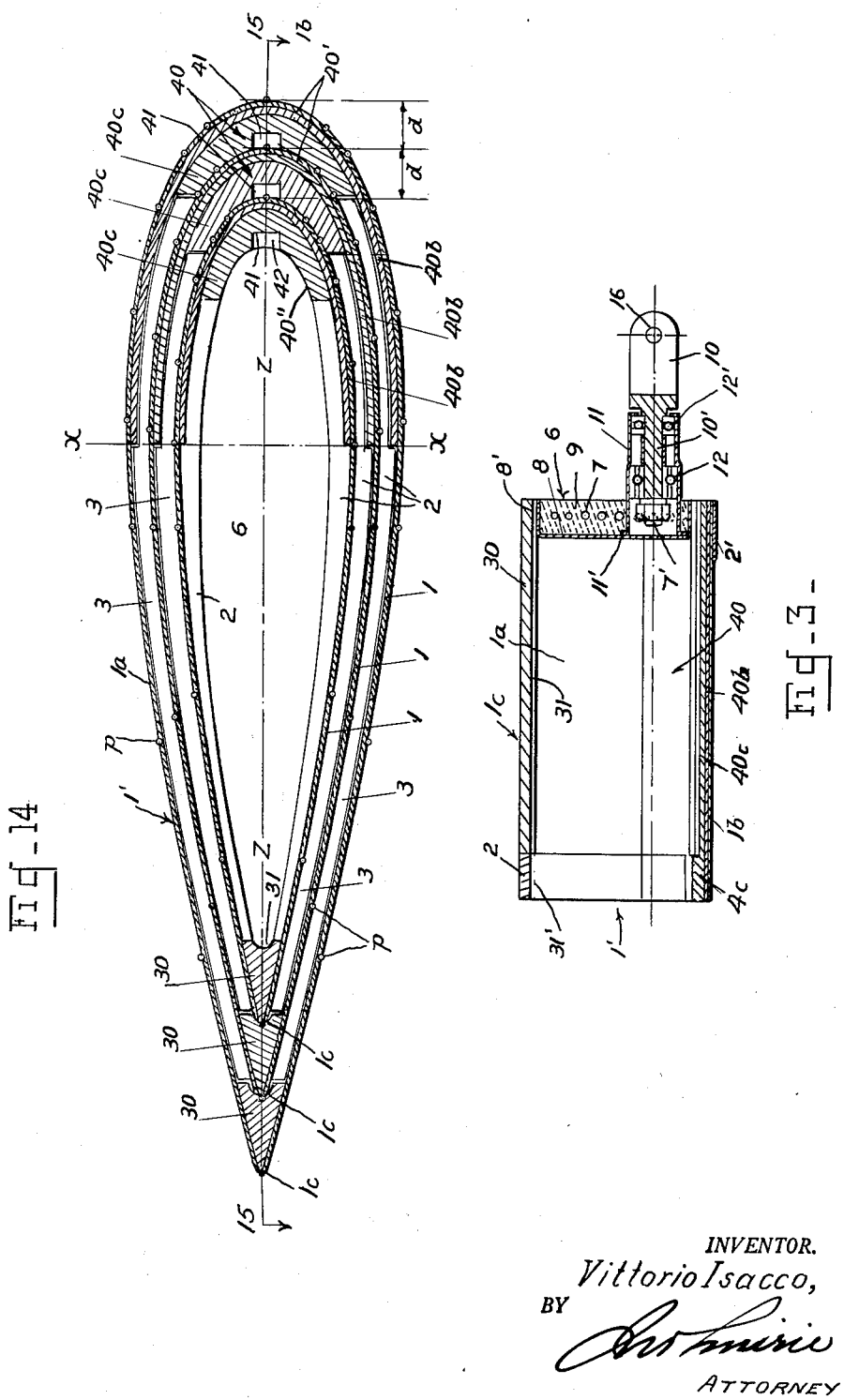
INVENTOR.
Vittorio Isacco,
BY
ATTORNEY July 19, 1955 V. ISACCO 2,713,393
TELESCOPIC BLADE FOR ROTATING WING AIRCRAFT
Filed June 10, 1952 6 Sheets-Sheet 3
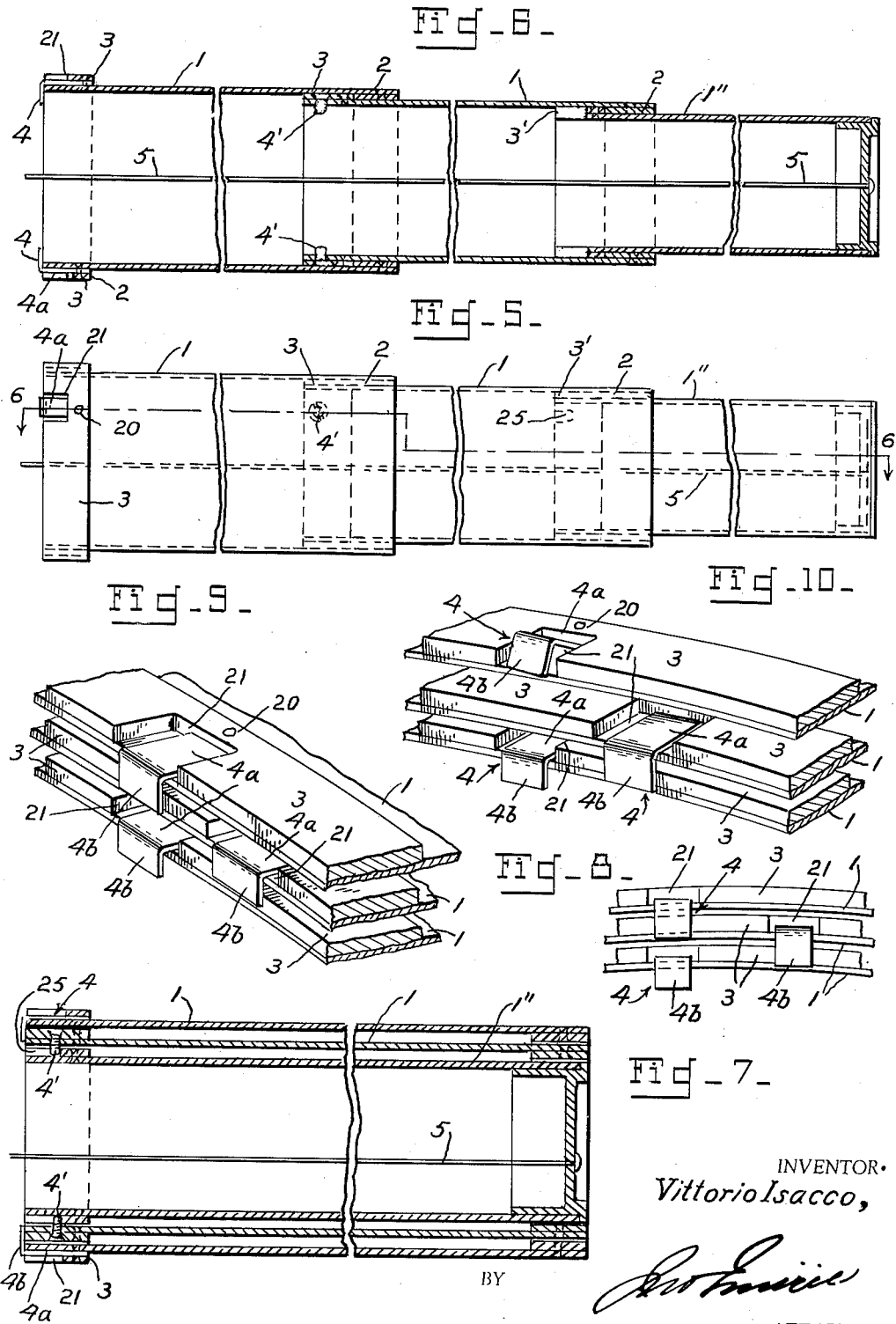
INVENTOR·
Vittorio Isacco,
BY
ATTORNEY

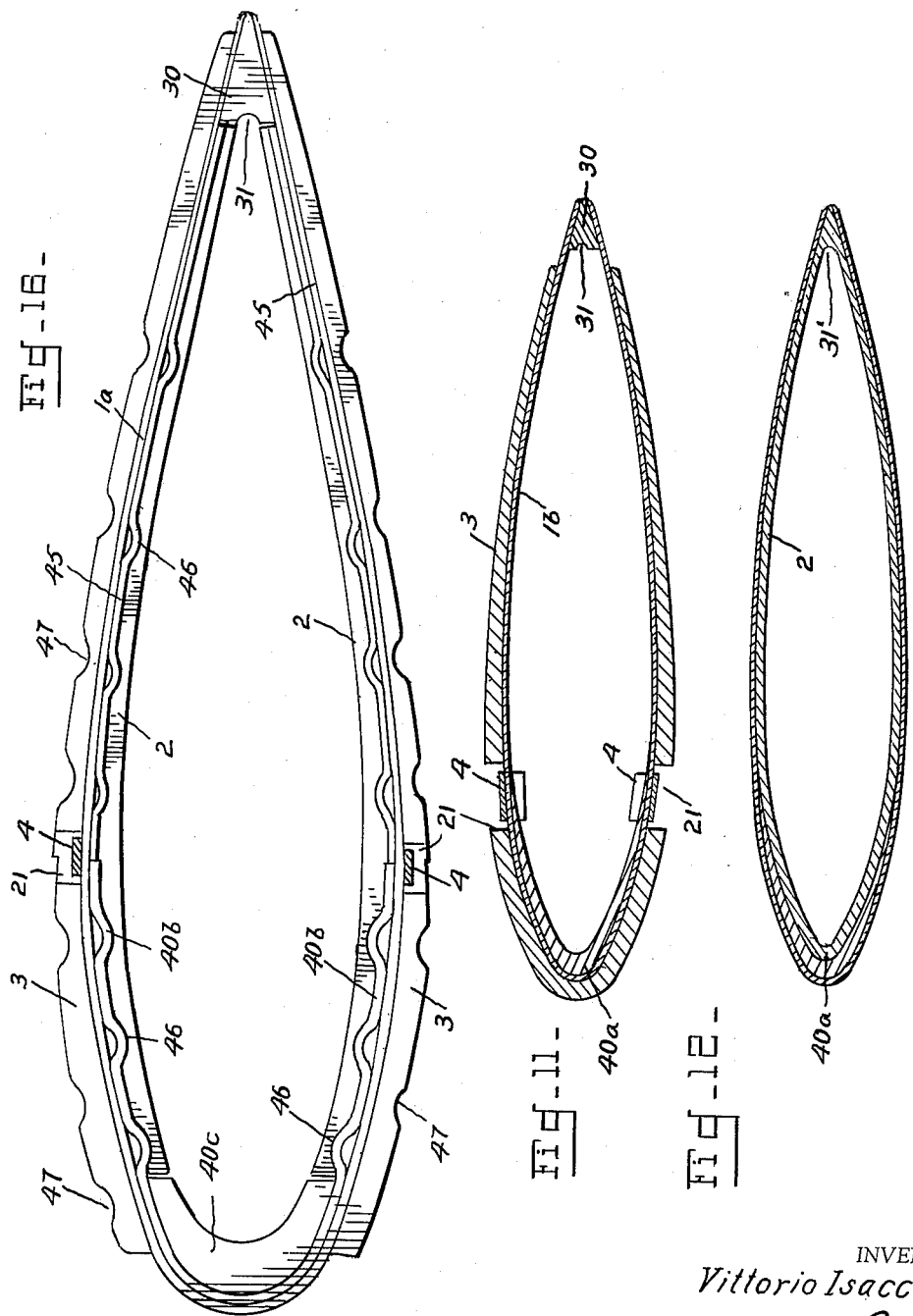

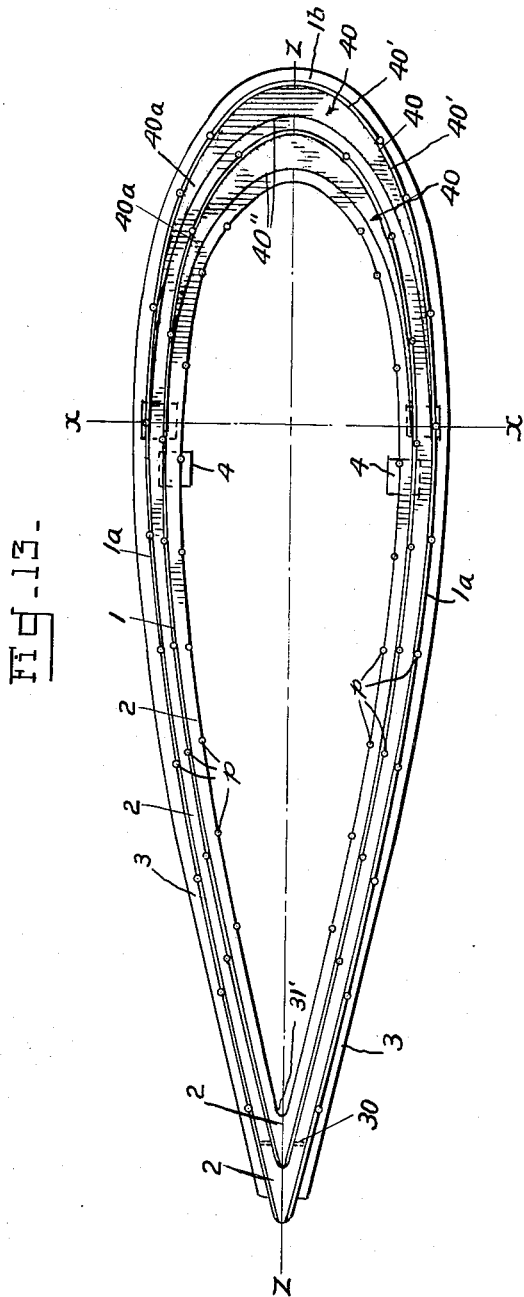

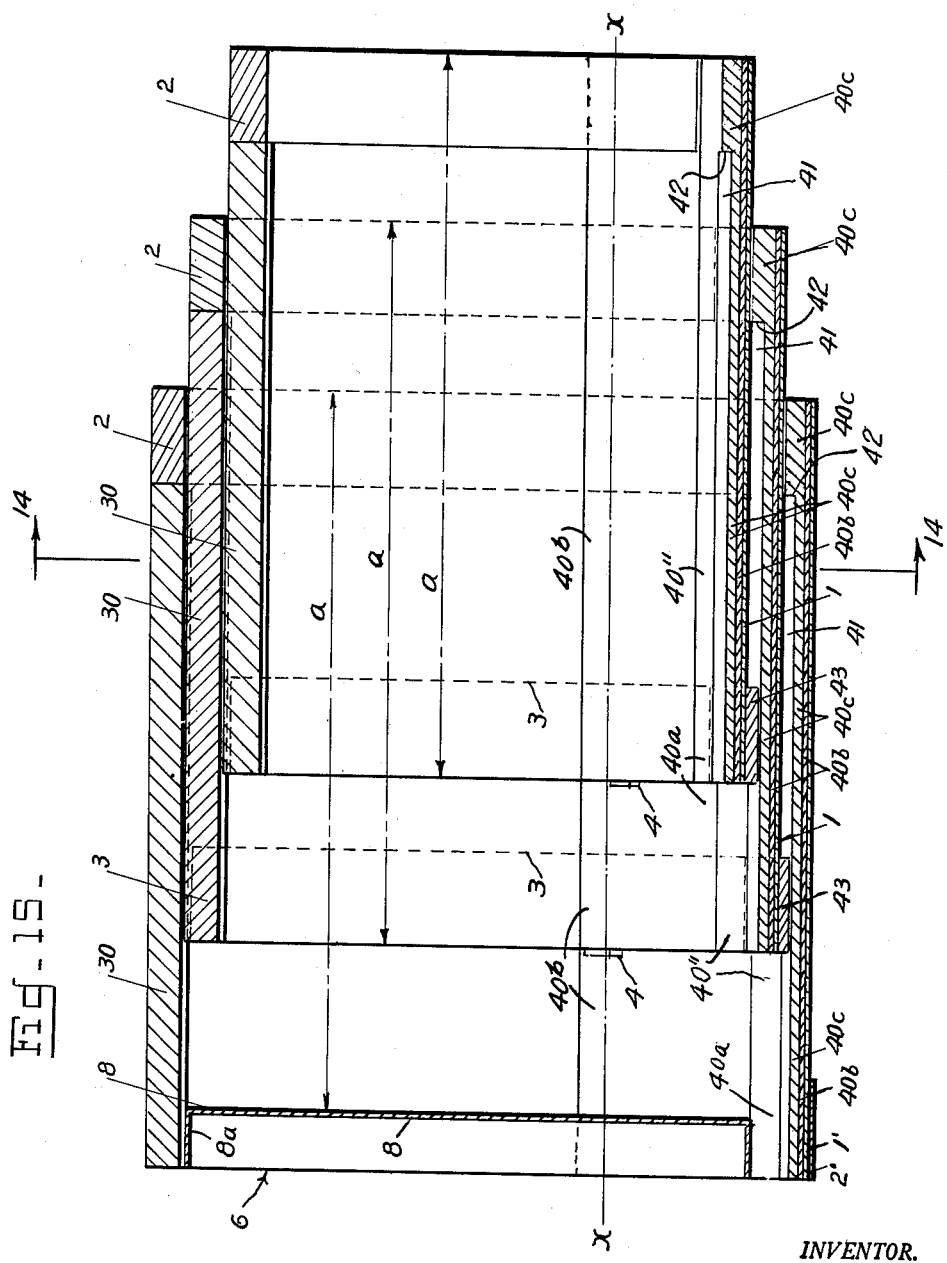

United States Patent Office 2,713,393
Patented July 19, 1955

2,713,393

TELESCOPIC BLADE FOR ROTATING WING AIRCRAFT

Vittorio Isacco, Paris, France

Application June 10, 1952, Serial No. 292,692

16 Claims. (Cl. 170—160.11)

My invention relates to rotatable wing aerial apparatus and more particularly to telescopic rotor blades.

This application is a continuation-in-part of application, Serial No. 1,458 filed January 9, 1948, issued May 4, 1953 as Patent No. 2,637,406.

Helicopter blades in translational flight are subject to strong variable pressures and oscillations and consequently have to be mass-balanced in order to avoid excessive and dangerous stresses. A mass-balanced blade is one having its center of gravity lying exactly on or near the center of air pressure in normal flight conditions.

Having in mind the foregoing difficulties, it is an object of the present invention to provide a telescopic blade, the elements of which may be readily assembled and disassembled.

It is another object of the invention to provide a telescopic blade that is mass-balanced to avoid excessive and dangerous stresses.

Another object of my invention is to provide practical means for mass-balancing the blade elements.

It is still another object of the invention to provide a telescopic blade having telescopic elements that are reinforced to withstand the vibration and variable stresses to which they are subjected during operation.

Still another object of my invention is to provide a reinforcement of the outer ends of the elements so that the skin of the element is not torn away due to vibration and variable stresses.

It is a further object of the invention to provide a telescopic blade having telescopic elements of precise airfoil section that are individually mass-balanced and reinforced and which may be readily assembled and disassembled.

It is a still further object of the invention to provide a telescopic blade having simplicity of organization, ease of fabrication and assembly, economy of construction and efficiency in operation.

The foregoing objects and others ancillary thereto are preferably accomplished according to a preferred embodiment of the invention by a telescopic blade having a root element with a removable end member and intermediate elements with retractable stops enabling the ready withdrawal of one element from within the others, a cable being connected to the tip element and extending through the blade for retracting the elements one within the other. The blade elements are of substantially the same length and the inner stops are offset relative to each other to enable the inner ends of the elements to be in substantially coplanar alignment when retracted and the elements to be completely nested within each other.

The blade is mass-balanced by means of a weight disposed within the leading edge portion of each blade element. This weight is of variable thickness and tapers rearwardly from the leading edge to also reinforce the skin or wall of the element. Preferably, the weight extends rearwardly from the leading edge for about one-third of the chord of the element.

The blade elements have fillers in their trailing edges to strengthen the edge and form slideways for the trailing edge of the element telescoped therein and an inner shoulder or collar at their outer ends to limit the extension of the telescoped element, as disclosed in my Patent No. 2,523,216. According to the present invention, the fillers extend only to the internal shoulders, and the shoulders are formed by internal collars which conform and are secured to the trailing edge portions to strengthen the skin or shell of the elements at the point of greatest bending moment during operation. They are shaped at their trailing edge by fillers which also constitute identical slideways for the trailing edges of the elements telescoped therein.

Large blade elements are strengthened by longitudinal internal ribs, as disclosed in my aforesaid Patent No. 2,523,216 but in the present invention, these ribs are formed by means of an internally laminated sheet having ribs formed therein, thereby increasing the strength and rigidity of the elements.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1 is a plan view of a telescopic rotor blade of six elements according to the invention, said blade being in extended operative position;

Figure 2 is a plan view of the blade shown in Figure 1 but in retracted position;

Figure 3 is a cross-sectional view of the root element of a blade, the section corresponding to a plan substantially intersecting the leading and trailing edges of the element;

Figure 4 is an enlarged plan view of one element embodying the preferred structure in accordance with the invention;

Figure 5 is a top plan view of the three outer or tip elements of a blade and illustrating two modifications of retractable stops at the inner ends of the elements;

Figure 6 is a cross-sectional view corresponding to line 6—6 of Figure 5;

Figure 7 is a cross-sectional view similar to Figure 6 but with the elements in retracted position;

Figure 8 is a fragmentary end view of a plurality of elements and illustrating the arrangement of the preferred embodiment of retractable stop means;

Figure 9 is a fragmentary view in perspective of the stops shown in Figure 8;

Figure 10 is a fragmentary view in perspective similar to Figure 9 but showing a stop retracted with the inner elements partially withdrawn;

Figure 11 is a cross-sectional view corresponding to line 11—11 of Figure 4;

Figure 12 is a cross-sectional view corresponding to line 12—12 of Figure 4;

Figure 13 is an end view of the outer ends of two nested elements of precise airfoil section of the type shown in Figure 4;

Figure 14 is a cross-sectional view taken transversely through three nested elements embodying a modification and corresponding to line 14—14 of Figure 15;

Figure 15 is a cross-sectional view corresponding to line 15—15 of Figure 14; and Figure 16 is an end view of a modified element.

Referring now to the drawings, specifically to Figures 1 and 2, a telescopic blade in accordance with the present invention comprises a plurality of intermediate elements 1, with a root element 1' at one end, and a tip element 1" at the other end.

According to the preferred construction, the intermediate elements telescope successively within the root element 1', and the tip element 1'' telescopes into the internal intermediate element. By this construction, the blade may be extended to operative position, as shown in Figure 1, or it may be retracted to storage position with the elements 1 and 1'' telescopically nested within the root element 1', as shown in Figure 2.

The intermediate elements, as best shown in Figures 1, 4 and 6, each comprise an internal shoulder 2 at its outer end and an external collar 3 and a retractable inwardly extending stop 4 at its inner end. These intermediate elements are identical except for size and the off-setting of the retractable stops 4 (Figures 8–10 and 15) to prevent their overlapping so that the elements may completely nest within each other when retracted, as shown in Figure 2.

The tip element 1'', as best shown in Figures 1, 5 and 6, differs from the intermediate elements 1, in that it has only an external collar 3' at its inner end, and the outer end is preferably closed.

The root element 1', as best shown in Figures 1, 2 and 3, differs from the intermediate elements 1, in that it has an internal shoulder 2 at its outer end, but the inner or root end has a reinforcing outer collar 2' and is substantially completely closed by a removable end closure 6 which is secured by bolts 7 that enables the removal of the intermediate and tip elements from the inner end of the root element 1'.

The telescopic blade is extended to operative position, as shown in Figure 1, either manually or by centrifugal action caused by revolving the blade. When the elements 1 and 1'' are telescopically extended, they are limited by the external collars 3 or 3' of the respective internal elements abutting the internal shoulders 2 of the respective external elements. Conversely, the blade is retracted, as shown in Figure 2, by means of a wire or cable 5 that is secured at one end to the tip element 1'', as shown in Figures 5 and 6, and extends longitudinally through the blade. For convenience in illustration, the blade elements are diagrammatically shown in Figure 5 and are not mass-balanced. The wire 5 may be secured in any desired manner and to any part of the tip element 1'' and its inner end may be pulled in any desired manner, as by means of a reel, as disclosed in my aforementioned Patent No. 2,637,406.

The end closure 6, as best shown in Figure 3, comprises a transversely disposed plate 8 having a configuration substantially conforming to the interior conformation of the root element 1'. The plate 8 has outwardly extending perpendicular flanges 8' which snugly telescope into the inner end of the root element, said flanges 8' being provided with bolt holes for the passage of the bolts 7. The cavity formed by the plate 8 and its flange 8' is substantially completely filled with a reinforcing filler 9 which also is provided with bolt holes for the bolts 7. Thus, the plate 8 and filler 9 form a plug which fits into and closes the inner or root end of the root element and is removably secured by the bolts 7 and screws 7' passing through the element 1' and plug or closure 6.

The closure 6 also supports the blade and in turn is supported by a hollow shaft 11 and a hinge member 10 adapted to be connected to the rotor hub. The hollow shaft 11 has one end, with a flange 11' (Figure 3), embedded in the filler 9 and rigidly secured substantially perpendicularly to the plate 8. This hollow shaft 11 is journalled, preferably by journal and thrust ball bearings 12 and 12' respectively, on a stub shaft 10' that is rigidly fixed to the member 10 or is an extension of it. A lever 15 is fixed externally to the hollow shaft 11 for controlling the angular position of the hollow shaft 11 about the stub shaft 13 and therefore the pitch angle of the blade.

The hinge member 10, as shown in Figure 2, is mounted on a substantially vertically disposed pivot 16 carried by a fork 17 having axially inclined aligned bearings 18 adapted to be mounted on a horizontal axis on the rotor hub. The angular relationship between the hinge member 10 and the fork 17 about the pivot 16 is maintained substantially constant by a pair of resilient abutments 19, such as rubber blocks, carried by the fork 17 and oppositely engaging the hinge member 10. The resilient abutments 19 enable a limited displacement of a few degrees by the blade about the pivot 16.

Returning now to the intermediate elements, the retractable stops 4, as best shown in Figures 5 through 10, preferably comprise L-shaped leaf springs, each having one arm 4a disposed substantially parallel to the outer surface of the element and anchored thereto within the inner surface of the external collar 3 by rivets 20 or the like, the collar 3 having a recess 21 in its outer side to permit flexing of the arm 4a, as shown in Figure 10. The other arms 4b of the springs extend inwardly beyond the internal surface of the element to abut the inner end of the interiorly telescoped element 1 or 1'', as best shown in Figures 8, 9 and 10.

Thus, to remove one of the elements 1 or 1'', it is merely necessary to retract the respective springs 4, as shown in Figure 10, and then withdraw the elements interiorly thereof. Therefore, a damaged element may be readily removed and replaced merely by removing the bolts 7 and screws 7' to separate the root element 1' and its end closure support 6, and then retracting the respective stops 4 to release a selected element 1 or 1''.

The arms 4b of the springs 4 are substantially flush with the inner ends of the elements so that said ends are disposed substantially in a plane when the elements are retracted. Moreover, the intermediate elements 1 and the tip element 1'' are of the same length $a$ (Figures 1, 2, 5 and 14) and the root element 1' is of said length $a$ from its outer end to the inner side of the end closure 6. By having the elements of uniform length, they completely nest within each other and their outer ends are substantially flush when said elements are retracted, as shown in Figure 2. Preferably, the inner ends of the elements or the end closure 6 is recessed to accommodate the thickness of the spring arms 4b, or the length of the root element 1' may be greater than the length $a$ by the thickness of said spring arms 4b so that the outer ends of the elements flush when the elements are retracted.

The stops 4 are arranged so that they will not interfere with each other when the elements 1 and 1'' are retracted. This is accomplished by limiting the length of the arms 4b so that they do not extend interiorly of the inner edge of the internally telescoped unit, as shown in Figures 7 and 8. Therefore, the arms 4b of telescoped units will only engage the immediate internal unit. In addition, the stops 4 of alternate units are off-set or staggered so that the stops of successive units will not coincide with each other, as shown in Figures 8 and 9.

The stops 4 are preferably provided on opposite sides of the elements 1, that is, the upper and the lower sides thereof, as shown in Figure 11, so that there is uniform pressure on both sides of the respective elements, and uneven pressure that might tend to angle or twist one element relative to the others and consequently jam is avoided. In addition, these stops are positioned substantially on a plane $x-x$ intersecting the center of weight and balance of the elements so that angulation or turning due to unbalance is avoided.

In lieu of the spring stops 4, the stops may comprise any suitable form, and an alternative modification is shown in Figures 5, 6 and 7 as comprising screws 4' which project inwardly through the collar 3 and the wall of the element 1 to engage an internal element 1, or as shown, the tip element 1''. In order that the elements may nest flush one within the others, the internal element 1 or 1'' is provided with a notch 25 in its inner end, the end of the notch 25 forming the abutment for the screw 4', as shown in Figure 7.

Each of the elements 1', 1 and 1'''' includes a shell or skin which comprises a metal sheet 1a that preferably is centrally bent to form a leading edge 1b, the opposite longitudinal edges of the sheet being joined to form a trailing edge 1c. As best shown in Figures 13 and 14, the sheet 1a is bent to a precise airfoil according to laboratory data indicated by the points p. In order to maintain the precise airfoil of the successive elements, each of the elements is provided with a bearer member 30 longitudinally of its trailing edge 1c and between the adjacent longitudinal edges of the sheet 1a. The apex or trailing edge of this assembly is rounded to provide a smooth slidable trailing edge, and the inner side of the member 30 has a centrally disposed longitudinal transversely curved groove 31 for slidably receiving the trailing edge of the internal element 1 or 1''.

According to the present invention, this bearer member 30, as best shown in Figures 3 and 15, extends from the inner end of the element to the inner side of the internal shoulder 2 at the outer end of the element, and the shoulder 2 is relatively wide and extends completely to the trailing edge, as best shown in Figures 3, 12 and 13, the inner apex of the shoulder at the trailing edge being provided with a channel 31' that forms a continuation of the groove 31 and slidably supports the trailing edge of the internal element.

The variable bending moments on the blades in translational flight are exercised mainly between the positions of the internal shoulder 2 of one element and the external collar 3 of the element within it, and the skin of the outer of these elements is in danger of being torn away at the outer end of the trailing edge.

It has been found that these stresses are best overcome by extending the internal shoulder 2 completely to the trailing edges to preclude two different moments on the skin at the outer corner. Moreover, the shoulder is relatively wide so as to provide ample support for the skin longitudinally of the element. In addition, the external collar 3 is also relatively wide and cooperates with the shoulder in supporting two elements over a substantial length at their joint when the elements are telescopically extended.

The shoulders 2 and the collars 3 are preferably formed by a plurality of substantially identical sections 2a and 3a respectively that are secured to the skin 1a in side-by-side relation, as best shown in Figure 4. By this arrangement the sections may be stamped from plate material, such for example as one inch plate, and then assembled as a unit. The edges of the sections 2a or 3a are preferably planar and abut each other to uniformly transmit the stresses throughout their whole area. The sections 2a and 3a may be fixed to the skin 1a only, or they may be laminated together as a unit. In any event, it is preferred that each section be fixed to the skin 1a.

The telescopic blade and its elements are both mass-balanced substantially about the vertical plane x—x and the horizontal plane Z—Z (Figure 13) by weight means 40 disposed within the leading edges of the elements. In accordance with the invention, this weight means is so arranged as to reinforce the elements as well as to occupy the least possible space to preclude excessive variation in size between the successive elements.

The weight means 40 may comprise a single crescent-shaped mass-balancing part 40a of crescent section, as best shown in Figures 11 and 12, or it may comprise a plurality of mass-balancing parts, two parts 40b and 40c being shown for example in Figures 3, 14 and 15.

Regardless of the modification of the weight means, the mass-balancing parts preferably extend the full length of the elements 1', as shown in Figure 3, or the elements 1 or 1'', as shown in Figures 14 and 15, to thereby brace as well as mass-balance the elements throughout their length. In addition, the mass-balancing parts extend rearwardly from the leading edge portions 16 of the elements, substantially uniformly from the center of the leading edge at the plane Z—Z, this rearward extension is about 35% of the chord of the elements and substantially coinciding with the vertical plane X—X, as shown in Figures 13 and 14.

The outer surface 40' of the weight means 40 preferably comprises an airfoil curvature transversely and corresponding to that of the internal surface of the skin 1a of the element in which it is mounted so that the leading edge portion of the element is reinforced throughout. The internal surface 40'' of the weight means 40 is also preferably curved transversely to correspond to the airfoil of the shoulder of the internal unit, as shown in Figure 13, or of the leading edge of the internal unit, as shown in Figure 14.

If the weight means 40 comprises a single mass or part 40a (Figure 13), the internal surface 40'' is tapered to the rear longitudinal edges of the part 40a so that the internal surface of the skin 1a and of the part 40a cooperatively define an airfoil section. In this form, the internal shoulder 2 preferably extends around the internal surface 40'' of the mass-balancing part 40a as a unitary member, and the external collar 3 of the internal element extends completely around the leading edge of said internal element and is slidable along the internal surface 40'' of the mass-balancing part 40a of the external element. While it is preferred that the internal surface 40'' have an airfoil configuration, it is obvious that in this modification this surface and the collar 3 slidable thereon should conform to each other and that they may be other than of airfoil configuration.

If the weight means 40 comprises a plurality of parts, such as the mass-balancing parts 40b and 40c in Figure 14, the external part 40b preferably comprises a plate-like member bent to the airfoil section of the respective leading edge 1b. The internal part 40c comprises a relatively thick bar-like piece that is preferably of accurate segmental airfoil section, preferably a chordal segmental section. The external surface of the internal part 40c is preferably of airfoil curvature exactly corresponding to to the internal surface of the plate 40b. Obviously, one or more additional plate-like mass-balancing parts may be interposed between the parts 40b and 40c, if desired.

In this modification, the internal shoulders 2 extend to and terminate at the rear longitudinal edges of the internal mass-balancing part 40c, the internal surface of the shoulders cooperative with the internal surface 40'' of the mass-balancing part to define an airfoil configuration corresponding substantially exactly to the airfoil of the respective internal element. The external collar 3 of the respective internal element is recessed and interrupted at the leading edge portion, as best shown in Figures 14 and 16, to accommodate the external and internal mass-balancing parts 40b and 40c respectively, because the leading edge 1b of the skin 1a slidably engages the internal surface 40'' of the weight means.

If desired, the connection of two successive elements may be strengthened at the leading edge to offset the interruption of the shoulder 2 and the collar 3. One arrangement for accomplishing this is shown in Figures 14 and 15 as comprising a longitudinal channel or groove 41 in the internal surface 40'' of the internal mass-balancing part 40c. This groove is preferably centrally of the leading edge and opens through the inner end of the element but terminating to form a shoulder 42 at the outer end of the element to coincide with the inner edge of the internal shoulder 2. The respective internal element is provided at its inner end with a lug 43 on the leading edge and coinciding exactly with the collar 3. When the elements are telescoped one within the other, the lug 43 slides in the groove 41, and upon extension of the elements, the lug 43 abuts the shoulder 42 to brace the elements substantially exactly at the leading edge.

The blade elements, particularly larger elements, may be additionally reinforced, as shown in Figure 16, by providing thin corrugated sheets 45 lining the skin 1a between the rear edges of the weight means 40, particularly between the mass-balancing plate 40b, and the bearer member 30. The free portions of the mass-balancing plate 40b are also preferably corrugated or otherwise deformed to provide also ribs 46 extending longitudinally of the elements to assist in reinforcing the skin 1a and guiding and bracing the elements. The external collars 3 are then provided with grooves 47 corresponding to and cooperative with the ribs 46 of the respective external element.

The various parts of the elements may be secured in any desired manner, such as by rivets, spot welding or the like. Preferably, however, the several parts are secured by gluing them together by any suitable glue compatible with metals. Thus, different metals, such as an aluminum skin 1a and steel weight means 40, which can not be easily welded, may be readily secured together by a suitable glue. In certain instances, the parts, particularly those subject to the greatest stress, such as the shoulders 2, collars 3 and bearer members 30, may be secured by both gluing and riveting or the like.

Although I have shown and described certain specific embodiments of my invention, I am fully aware that many modifications thereof are possible. The invention, therefore, is not to be restricted except insofar as is necessitated by the prior art and by the spirit of the appended claims.

What I claim is:

1. A blade for a sustaining propeller of a rotatable wing aerial apparatus, comprising a plurality of telescopic elements, including a root element, at least one intermediate element and a tip element, said intermediate element comprising a thin wall shell of airfoil section, a reinforcing collar surrounding the inboard end of said shell, stop means extending inwardly from the inner surface of said shell at the outboard end thereof, said collar forming a stop cooperative with like stop means at the outboard end of a surrounding element and said stop means cooperating with a like collar on a surrounded element to limit outward telescoping movement therebetween, a retractable stop carried by the inboard end of said intermediate element within the peripheral surface of said collar and normally extending inwardly of said element for engagement with the inboard end of a surrounded element in nested position and being retractable outwardly to permit complete withdrawal of said surrounded element, and an abutment portion on the inboard end of a surrounded element for engagement with said stop to position the ends of the elements in substantially coplanar alignment with the surrounded element completely nested within the surrounding element.

2. A blade as defined in claim 1 wherein said stop comprises a flat L-shaped spring having one leg mounted within a recess in said collar and secured at its end to permit flexing, the other leg of said spring extending over the edge of the shell.

3. A blade as defined in claim 1 wherein said stop comprises a screw threaded through said collar and shell, and said abutment portion comprises a recess in the edge of said surrounded element to accommodate the space between said screw and the edge of the surrounding element.

4. A blade as defined in claim 1 wherein said stops on succeeding elements are laterally offset.

5. A telescopic blade for a sustaining propeller of a rotatable wing aerial apparatus, which blade comprises a plurality of telescopic elements including a root element, a plurality of intermediate elements and a tip element, each of said elements including a thin wall shell of precise airfoil section, a bearer member in the trailing edge portions of said elements, the bearer members in the root and intermediate elements having in the inner sides thereof a longitudinal groove forming a slideway for the trailing edge of the respective internal elements, internal shoulders within the outboard ends of said root and intermediate elements, external collars on the inboard ends of said intermediate and tip elements for abutment with said internal shoulders in the respective external elements to limit the telescopic extension of said elements, said bearer members in said root and intermediate elements extending from the inner ends of said elements to the inner edges of said internal shoulders, said internal shoulders extending around the interior of said shell and completely to the trailing edge and constituting bearers in the trailing edges at their outboard end portions as a continuation of the bearer members, said external collars terminating short of the trailing edges of said elements to accommodate said bearer members in the respective external elements, retractable stops on the inboard ends of said intermediate elements within the peripheral surfaces of said external collars and normally extending inwardly of said elements for engagement with the inboard ends of the respective internal elements in nested position, said stops being retractable outwardly to enable complete withdrawal of the respective internal elements, an end closure and support at the inboard end of said root element, means removably securing said root element to said end closure and support to enable withdrawal of the internal elements through the inboard end of said root element, and mass-balancing parts fixed to the inner sides of said elements within and extending around the leading edges thereof and mass-balancing said elements to provide a mass-balanced blade, said mass-balancing parts being thicker at the center of the leading edge portion and of decreased thickness towards the rear edge portions.

6. A telescopic blade for a sustaining propeller of a rotatable wing aerial apparatus, which blade comprises a plurality of telescopic elements including a root element, a plurality of intermediate elements and a tip element, each of said elements including a thin wall shell of precise airfoil section, a bearer member in the trailing edge portions of said elements, the bearer members in the root and intermediate elements having in the inner sides thereof a longitudinal groove forming a slideway for the trailing edge of the respective internal elements, internal shoulders within the outboard ends of said root and intermediate elements, external collars on the inboard ends of said intermediate and tip elements for abutment with said internal shoulders in the respective external elements to limit the telescopic extension of said elements, and mass-balancing parts fixed to the inner sides of said elements within and extending around the leading edges thereof and extending longitudinally along the complete length of said elements for mass-balancing each of said elements to provide a mass-balanced blade, said mass-balancing parts being thicker at the center of the leading edge portion and of decreased thickness towards the rear edge portions and having outer and inner surfaces with the outer surfaces substantially conforming to the configuration of the leading edge portions of said elements and the inner surfaces substantially conforming to the external collars of the respective internal units.

7. A telescopic blade for a sustaining propeller of a rotatable wing aerial apparatus, which blade comprises a plurality of telescopic elements including a root element, a plurality of intermediate elements and a tip element, each of said elements including a thin wall shell of precise airfoil section, a bearer member in the trailing edges of said elements, the bearer members in the root and intermediate elements having in the inner sides thereof a longitudinal groove forming a slideway for the trailing edge of the respective internal elements, internal shoulders within the outboard ends of said root and intermediate elements, external collars on the inboard ends of said intermediate and tip elements for abutment with the internal shoulders in the respective external elements to limit the telescopic extension of said elements, said bearer members in said root and intermediate elements extending from the inboard ends of said elements to the inner edges of said internal shoulders, said external collars terminating short of the trailing edges of said elements to accommodate said bearer members in the respective external elements, and said internal shoulders extending around the interior of said shell and completely to the trailing edge and constituting bearers in the trailing edges at their outboard end portions as a continuation of the bearer members.

8. A telescopic blade for a sustaining propeller of a rotatable wing aerial apparatus, which blade comprises a plurality of telescopic elements, each of said elements including a thin wall shell of precise airfoil section, a bearer member in the trailing edges of said elements, said bearer members having in the inner sides thereof a longitudinal groove forming a slideway for the trailing edge of the respective internal elements, internal shoulders within the outboard ends of said elements, external collars on the inboard ends of said elements for abutment with the internal shoulders in the respective external elements to limit the telescopic extension of said elements, said bearer members extending from the inboard ends of said elements to the inner edges of said internal shoulders, said internal shoulders extending around the interior of said elements and completely to the trailing edges and constituting bearers at the outboard end portion of the trailing edges as a continuation of the bearer members, said external collars terminating short of the trailing edges of said elements to accommodate said bearer members in the respective external elements, and mass-balancing parts fixed to the inner sides of said elements within and extending around the leading edges thereof and extending longitudinally along the complete length of said elements for mass-balancing each of said elements to provide a mass-balanced blade, said mass-balancing parts being thicker at the center of the leading edge portion and of decreased thickness towards the rear edge portions and having outer and inner surfaces with the outer surfaces substantially conforming to the configuration of the leading edge portions of said elements and the inner surfaces substantially conforming to the external collars of the respective internal units.

9. A telescopic blade for a sustaining propeller of a rotatable wing aerial apparatus, which blade comprises a plurality of telescopic elements including a root element, a plurality of intermediate elements and a tip element, each of said elements including a thin wall shell of precise airfoil section, a bearer member in the trailing edge portions of said elements, the bearer members in the root and intermediate elements having in the inner sides thereof a longitudinal groove forming a slideway for the trailing edge of the respective internal elements, internal shoulders within the outboard ends of said root and intermediate elements, external collars on the inboard ends of said intermediate and tip elements for abutment with the internal shoulders in the respective external elements to limit the telescopic extension of said elements, said bearer members in said root and intermediate elements extending from the inboard ends of said elements to the inner edges of said internal shoulders, said internal shoulders extending around the interior of said elements and completely to the trailing edges and constituting bearers at the outboard end portions of the trailing edges as a continuation of the bearer members, said external collars terminating short of the trailing edges of said elements to accommodate said bearer members in the respective external elements, and mass-balancing parts fixed to the inner sides of said elements within and extending around the leading edges thereof and extending longitudinally along the complete length of said elements for mass-balancing each of said elements to provide a mass-balanced blade, said mass-balancing parts being thicker at the center of the leading edge portion and of decreased thickness towards the rear edge portions and having outer and inner surfaces with the outer surfaces substantially conforming to the configuration of the leading edge portions of said elements and the inner surfaces substantially conforming to the external collars of the respective internal units.

10. A mass-balanced telescopic blade as defined in claim 9 wherein said mass-balancing parts extend laterally from the leading edges for about 35% of the chord of said elements.

11. A mass-balanced telescopic blade as defined in claim 9 wherein the mass-balancing parts have inner and outer surfaces which taper to edges, and said internal shoulders extend around the inner surfaces of said parts.

12. A mass-balanced telescopic blade as defined in claim 9 wherein the inner surfaces of the internal shoulders and of the mass-balancing parts conform to the airfoil section of the respective internal shoulders.

13. A mass-balanced telescopic blade as defined in claim 9 wherein said mass-balanced parts are of segmental section and said internal shoulders extend to the edges of said parts, the external collars on the respective internal elements being cut-away to accommodate said mass-balancing parts, said mass-balanced parts having longitudinal grooves in their inner sides, and a tongue-like lug on the leading edges at the inboard ends of the respective internal elements and slidable in said grooves.

14. A mass-balanced telescopic blade as defined in claim 9 wherein said mass-balanced parts comprise a curved plate extending around the leading edges of said elements, and thicker bar-like portions within the leading edges and on the inside of said plates.

15. A mass-balanced telescopic blade as defined in claim 9 wherein said mass-balanced parts comprise a curved plate extending around the leading edges of said elements to about one-third of their chord with thicker bar-like portions within the leading edges and on the insides of said plates, reinforcing sheets thinner than said plates and lining the insides of said elements and extending from said plates to the trailing edges, said sheets and preferably the free portions of said plates having longitudinal reinforcing ribs formed thereon.

16. A mass-balanced telescopic blade as defined in claim 9 wherein said internal shoulders and external collars each comprise a plurality of identically shaped parts extending transversely of the elements and in side-by-side engagement throughout their lengths.

References Cited in the file of this patent

UNITED STATES PATENTS

| | | |
|---|---|---|
| 2,038,337 | Ballman | Apr. 21, 1936 |
| 2,081,647 | Squires | May 25, 1937 |
| 2,108,245 | Ash | Feb. 15, 1938 |
| 2,630,868 | Ellenberger | Mar. 10, 1953 |